United States Patent [19]

Ono et al.

[11] Patent Number: 4,807,072
[45] Date of Patent: Feb. 21, 1989

[54] HEAD POSITION CONTROL MECHANISM FOR A MAGNETIC DISK APPARATUS WITH HEAD LOCKING

[75] Inventors: Mamoru Ono, Achikawa; Kenji Takeuchi, Kawasaki, both of Japan

[73] Assignee: Teac Corporation, Tokyo, Japan

[21] Appl. No.: 899,940

[22] Filed: Aug. 25, 1986

[30] Foreign Application Priority Data

Sep. 10, 1985 [JP] Japan .................................. 60-200191

[51] Int. Cl.⁴ .......................... G11B 5/54; G11B 21/02
[52] U.S. Cl. ....................................... 360/105; 360/75
[58] Field of Search ................ 360/75, 78, 86, 97–99, 360/103–106, 109; 369/215, 222, 244, 257

[56] References Cited

U.S. PATENT DOCUMENTS 4,706,142 11/1987 Hattori et al. ...................... 360/106

*Primary Examiner*—Alan Faber
*Assistant Examiner*—Steven R. Garland

*Attorney, Agent, or Firm*—Woodcock Washburn Kurtz Mackiewicz & Norris

[57] ABSTRACT

In a magnetic disk apparatus such as a Winchester drive, a head position control mechanism is provided for locking the transducer head on a noneffective surface region of the magnetic disk, where no data is to be stored, as when the apparatus is powered off. A locking lever pivots in a plane parallel to the disk plane for movement into and out of locking engagement with a rotary member rotatable jointly with the head arm about a common axis. A solenoid holds the locking lever out of locking engagement with the rotary member during the progress of data transfer between disk and head. Upon completion of the data transfer, or when the apparatus is electrically turned off, the solenoid becomes deenergized, permitting the locking lever to be sprung into locking engagement with the rotary member. Then the head arm transports the head to, and allows the same to land on, the noneffective surface region of the disk. The head is locked in that position as long as the locking lever remains in locking engagement with the rotary member.

1 Claim, 3 Drawing Sheets

HEAD POSITION CONTROL MECHANISM FOR A MAGNETIC DISK APPARATUS WITH HEAD LOCKING

BACKGROUND OF THE INVENTION

Our invention is in the field of magnetic disk drives such as, typically, those of the Winchester type wherein the transducer head "flies" or is airborne at a small spacing from the magnetic recording surface of a hard disk during the transfer (reading or writing) of data therewith. More particularly, our invention concerns a mechanism in such magnetic disk apparatus for controlling the radial position of the transducer head on the recording disk.

In the Winchester disk drive, as is well known, the magnetic transducer head or heads are aerodynamically maintained out of contact with the recording surface or surfaces as the disk or disks rotate at a sufficiently high speed for data transfer. As the disk speed drops upon completion of data transfer, each head lands on the associated disk surface and stays in contact therewith until the disk speed builds up to a predetermined degree at the start of the next run of data transfer. Accordingly, if the disk drive is subjected to shocks or vibrations while each head is thus maintained in contact with the associated disk, the disk surface has been easy to be ruined by the hand sliding therefore.

A solution, though incomplete, to this problem is found in U.S. Pat. No. 4,593,329 issued to Hayakawa and assigned to the assignee of our present application. This patent takes advantages of the fact that not all the surface of the magnetic disk but a limited annular part thereof is actually used for data storage. Thus the disk surface has "noneffective" annular regions, where no data is to be stored, that are located both radially inwardly and outwardly of the effective data storage region. Hayakawa suggests to position the head on one of the noneffective surface regions of the disk when the disk is out of rotation, or in rotation at less than a prescribed speed, thereby avoiding the contact of the head with the effective surface region of the disk. However, the head is not locked in that standby position according to this prior art.

We have found that it presents no serious problem in one type of disk drive, but is a fatal defect in another, to leave the head unlocked in the standby position as in the noted prior art. There are two well known methods of transporting the head from track to track on the magnetic disk. One is to employ a rotary actuator, typically a stepping motor, in combination with a mechanism for translating its rotation into the linear motion of the head in a radial direction of the disk. The other is to use an angular actuator such as a voice coil motor for directly driving a pivoted head arm carrying the head.

In the first mentioned type of head transport mechanism, the rotary to linear converter interposed between the motor and the head carriage serves to mechanically hold the head in the standby position to some extent in the face of mechanical vibrations applied to the apparatus. Although the rotor of the stepping motor is susceptible to displacement when it is not energized with a holding current, no significant displacement of the head will normally result by reason of the interposition of the motion translating mechanism.

However, in the second recited type of head transport mechanisms, the angular motion of the voice coil motor is transmitted directly to the head arm. As the motor coil is displaced, so is the head on the head arm. Consequently, left unlocked on the noneffective surface region of the disk according to the prior art, the head driven by this type of head transport mechanism has been easy to move onto the effective surface region of the disk. This disadvantage becomes all the more serious because the coil of the voice coil motor is particularly susceptible to displacement because of the motor construction itself.

SUMMARY OF THE INVENTION

We have hereby invented how to lock, as required, the head on a noneffective surface region of the magnetic disk against accidental displacement to its effective surface region in a disk drive of the type employing a pivoted arm for head transportation from track to track on the disk.

Briefly, our invention may be summarized as a head position control mechanism for an apparatus for data transfer with a disklike recording medium having arranged in a radial direction thereon both an effective surface region capable of storing data and a noneffective surface region where no data is to be stored. The head position control mechanism comprises a head transport mechanism including a pivotal head arm for supporting a transducer head and for transporting the same substantially radially of the recording medium. The head transport mechanism is of such construction that the transducer head contacts the recording medium at least when the latter is out of rotation; that is, the head may be either in or out of contact with the recording medium during the progress of data transfer. Also included is a head locking mechanism acting on the head transport mechanism for causing the head arm to pivotally transport the transducer head to, and lock the latter on, the noneffective surface region of the recording medium when the data transfer between the recording medium and the transducer head is not required.

Preferably, the head locking mechanism comprises a locking member movable into and out of locking engagement with a rotary member which is pivotable jointly with the head arm of the head transport mechanism about a common axis. The locking member may be automatically activated out of locking engagement with the rotary member when the disk drive is electrically turned on. The head transport mechanism is therefore free to transport the head for track accessing during the subsequent process of data transfer. When the disk drive is powered off upon completion of the data transfer, the locking member will be actuated into locking engagement with the rotary member, in such a manner that the head is moved to the noneffective surface region of the recording disk and locked in contact therewith. Thereafter, as long as the locking member remains in locking engagement with the rotary member, there is no likelihood of the head being accidentally displaced onto the effective surface region of the recording disk despite shocks or vibrations that may be applied to the disk drive while the latter is held out of operation.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

Figure 1:
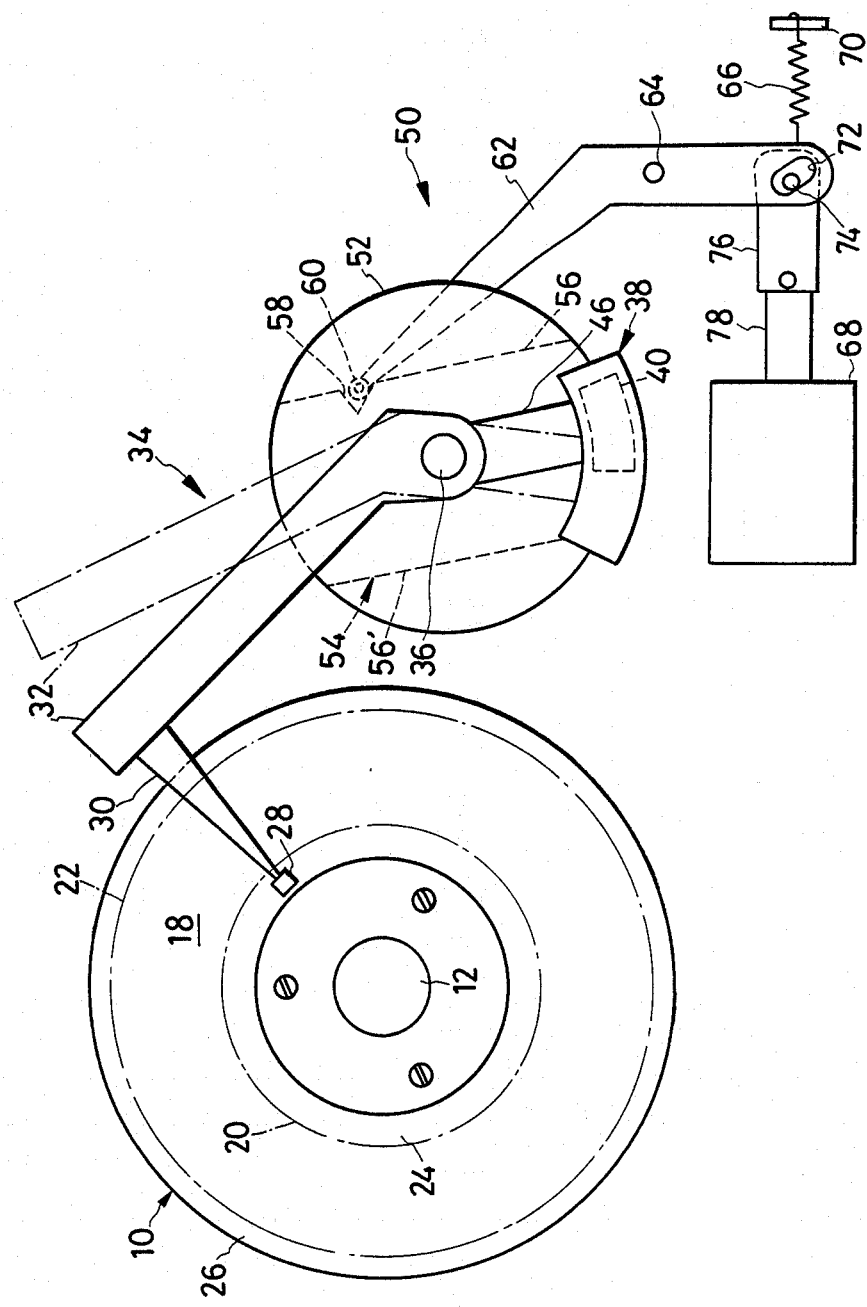
FIG. 1 is a diagrammatic plan view of the head position control mechanism of our invention as adapted for use in a hard disk drive.

We will now describe in detail the head position control mechanism of our invention as adapted for use in a Winchester disk drive having a built in hard disk or disks. As will be seen from FIGS. 1 and 2, the Winchester drive has two hard magnetic disks 10 rigidly and concentrically mounted to an upstanding drive spindle 12 with a spacing between the disks. However, for the purposes of our invention, the provision of the two magnetic disks is not essential, so that we will describe the apparatus as if it had only one magnetic disk. The drive spindle 12 forms a part of a conventional disk drive mechanism 14, FIG. 2, which further comprises an electric disk drive motor 16 coupled directly to the drive spindle. We have shown the disk drive motor 16 as being of the known rotor outside stator configuration. The disk drive mechanism 14 functions to rotate the magnetic disk 10 at high speed in a predetermined direction.

FIG. 1 indicates that the magnetic disk 10 has an annular effective surface region 18 where data is to be stored and which is bounded by two concentric dashed lines 20 and 22. Further the magnetic disk 10 has two annular noneffective surface regions 24 and 26 where no data is to be stored and which are disposed radially inwardly and outwardly, respectively, of the effective surface region 18 in concentric relation thereto.

Figure 2:
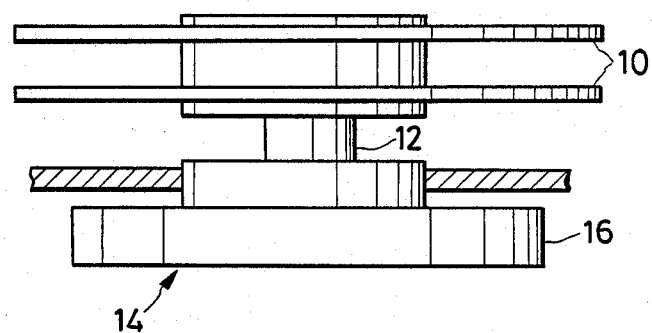
FIG. 2 is a side elevation showing a pair of hard recording disks together with a disk drive motor for imparting rotation thereto, in the hard disk drive of FIG. 1.

At 28 in FIG. 1 is shown a magnetic transducer head for data transfer with the effective surface region 18 of the magnetic disk 10. If the disk drive has two magnetic disks as shown in FIG. 2, and additional transducer head must of course be provided for the other disk. Further, if each magnetic disk is double sided (i.e. both of its opposite faces used for data storage), then one pair of transducer heads may be provided on the opposite sides of each disk. In its simplest form, however, the disk drive to which our invention finds application may have but one magnetic disk, as has been stated previously, and only one of its opposite faces may be used for data transfer with a single transducer head.

The transducer head 28 is mounted via a cantilever spring 30 to a distal end of a head arm 32 constituting a part of a head transport mechanism 34. Proximally mounted fast to an upstanding pivot pin 36, the head arm 32 pivots between the solid line and phantom positions of FIG. 1, thereby transporting the transducer head 28 substantially radially of the magnetic disk 10. The transducer head 28 is so designed, and so resiliently mounted to the head arm 32, that the head flies at a small spacing above the magnetic disk 10 as the latter rotates at a prescribed high speed. The noncontact data transfer has it as a primary aim to assure intimate interaction between the transducer head and the magnetic disk without wear of the contacting surfaces through friction. The cantilever spring 30 permits the transducer head 28 to land on the magnetic disk 12 when the rotational speed of the disk fails to a certain ascertainable degree.

Figure 4:
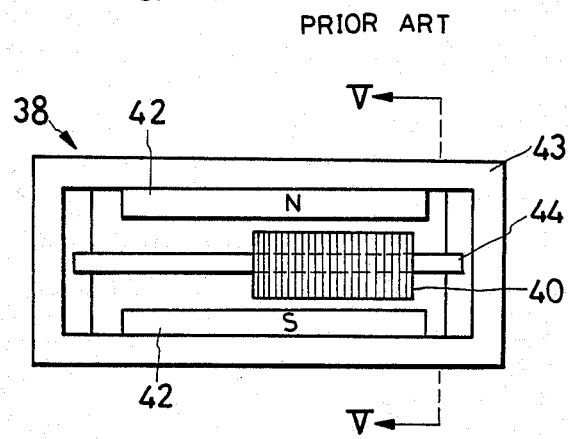
FIG. 4 is a diagrammatic elevation of a voice coil motor included in the hard disk drive of FIG. 1 for head transportation over the recording disk.
Figure 5:
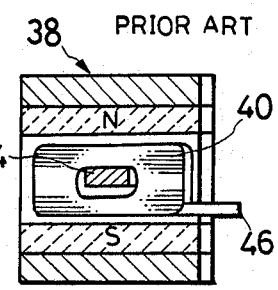
FIG. 5 is a cross section through the voice coil motor, taken along the line V—V in FIG. 4.

The head transport mechanism 34 further includes an electric motor herein shown as a voice coil motor 38 of known construction. As illustrated in detail in FIGS. 4 and 5, the voice coil motor 38 has a moving coil 40 interposed between a pair of permanent magnets 42 carried by a yoke 43. The moving coil 40 is movable relative to the permanent magnets 42 along an arcuate guide 44 centered about the pivot pin 36. As will be seen by referring back to FIGS. 1 and 3, a link 46 rigidly connects the moving coil 40 to the pivot pin 36 which has its opposite ends rotatably journaled in a pair of bearings 48.

The moving coil 40 of the voice coil motor 38 is angularly displaced in either direction along the guide 44 depending upon the direction in which the coil is energized. The link 46 transmits such angular displacement of the moving coil 40 to the pivot pin 36 and thence to the head arm 32, thereby causing the transducer head 28 to travel substantially radially of the magnetic disk 10.

The reference numeral 50 in FIG. 1 generally denotes a head locking mechanism forming the gist of our invention. The head locking mechanism 50 comprises a rotary disk 52 mounted fast on the pivot pin 36 for joint rotation therewith. As better illustrated in FIGS. 3 and 6, the rotary disk 52 has a downward protuberance 54 extending diametrally of the disk and having a pair of opposite lateral surfaces 56 and 56'. The lateral surface 56 of the protuberance 54, oriented away from the magnetic disk 10, has defined therein a notch 58 which is displaced in a predetermined direction from a notional line extending radially of the rotary disk 52 and at right angles with the surface 56.

Movable into and out of locking engagement in the notch 58 is a roller 60 rotatably mounted on a first end of a locking lever 62 medially pivoted at 64 for rotation in a plane that is normal to the axis of the pivot pin 36 and, therefore, parallel to the plane of the magnetic disk 10. As indicated in FIG. 1, the roller 60 becomes engaged in the notch 58 when the transducer head 28 is positioned on the inner noneffective surface region 24 of the magnetic disk 10.

The head locking mechanism 50 further comprises drive means for actuating the locking lever 62 into and out of locking engagement with the rotary disk 52. As illustrated in FIG. 1, the drive means include a helical tension spring 66 and a linear actuator herein shown as a solenoid 68. Acting between a second end of the locking lever 62 and a stationary part 70, the tension spring 66 functions to urge the locking lever into locking engagement with the rotary disk 52. For connection to the solenoid 68 the second end of the locking lever 62 is slotted at 72 for slidably engaging a pin 74 on a link 76 coupled collinearly to the plunger 78 of the solenoid 68. Thus, when energized, the solenoid 68 turns the locking lever 62 in a clockwise direction, as viewed in FIGS. 1 and 6, against the force of the tension spring 66, thereby causing the roller 60 to move out of the notch 58 in the rotary disk 52. With the locking lever 62 thus disengaged from the rotary disk 52, with head transport mechanism 34 is free to transport the transducer head 28 from track to track on the magnetic disk 10.

The deenergization of the solenoid 68 results in the movement of the roller 60 into contact with the surface 56 of the rotary disk 52 under the force of the tension spring 66. At this time, as indicated by the dashed lines FIG. 6, the roller 60 will contact the surface 56 at such a point thereon that the rotary disk 52, and therefore the head arm 32, will pivot in a counterclockwise direction, as viewed in FIGS. 1 and 6, under the influence of the tension spring 66. Rolling over the surface 56, the roller 60 will become engaged in the notch 58 when the transducer head 28 is positioned over the noneffective surface region 24 of the magnetic disk 10. We understand that in this particular embodiment, the solenoid 68 remains energized as long as the complete disk drive is held powered on, becoming deenergized when the device is switched off.

Figure 3:
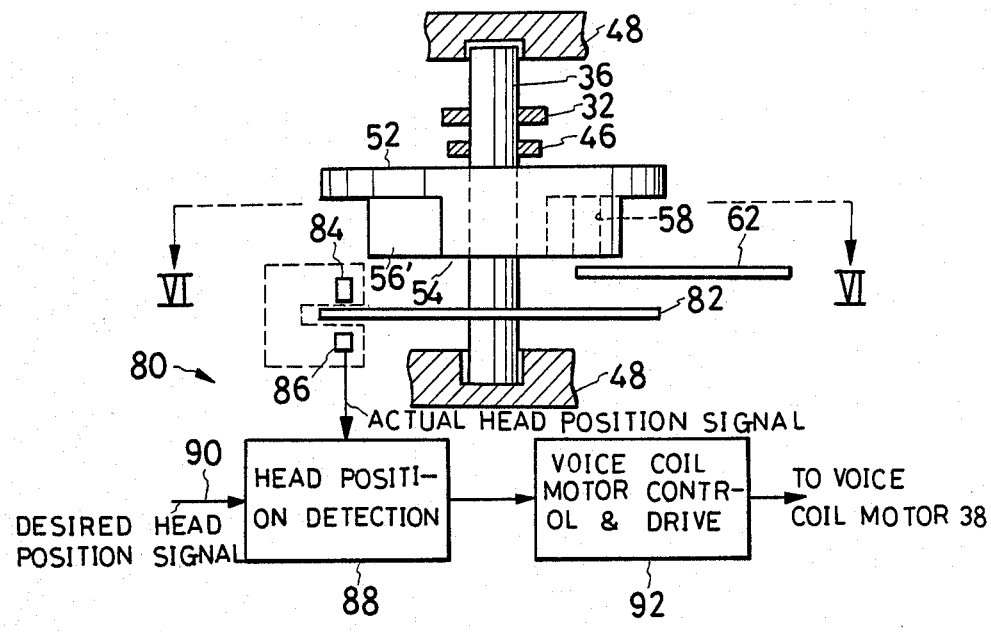
FIG. 3 is a side elevation, partly shown sectioned and broken away for illustrative convenience, of parts of the head position control mechanism of FIG. 1, together with a block diagram of an access control system.

For transporting the transducer head 28 to a desired track on the magnetic disk 10, the voice coil motor 38 is conventionally controlled by an accessing system comprising the means shown at 80 in FIG. 3. Included in such means 80 is a slitted disk 82 rigidly mounted on the pivot pin 36. A light source 84 and a photodetector 86 are disposed opposite each other across the disk 82. As the disk 82 rotates with the head arm 32, the photodetector 86 is irradiated by the light source 84 through the slits, not shown, in the disk 82, thereby producing electric pulses at a rate determined by the speed of the angular displacement of the head arm. It is therefore possible to ascertain the position of the transducer head 28 in the radial direction of the magnetic disk 10 by counting the number of the output pulses of the photodetector 86.

A head position detecting circuit 88 is electrically connected to the photodetector 86 for shaping and counting the pulses received therefrom. Further, inputting by way of a line 90 a signal indicative of a track on the magnetic disk 10 to which the transducer head 28 is to be accessed, the head position detecting circuit 88 compares this desired track with the actual track on which the transducer head 28 is now positioned, and delivers a signal representative of a difference, if any, therebetween to a voice coil motor control and drive circuit 92. This circuit 92 energizes the moving coil 40 of the voice coil motor 38 in a manner necessary for moving the transducer head 28 to, and positioning the same on, the desired track on the magnetic disk 10.

Figure 7:
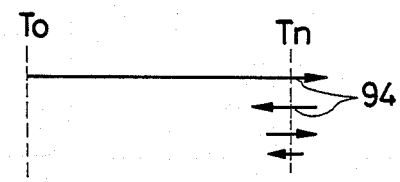
FIG. 7 is a diagram explanatory of the way in which the head is accessed to a desired track in the hard disk drive of FIG. 1.

FIG. 7 is explanatory of the way in which the transducer head 28 is moved from any track To to any other desired track Tn. As indicated by the arrows 94 in this figure, the voice coil motor 38 is servo controlled in accordance with the prior art to position the head 28 exactly on the desired track Tn.

OPERATION

Figure 6:
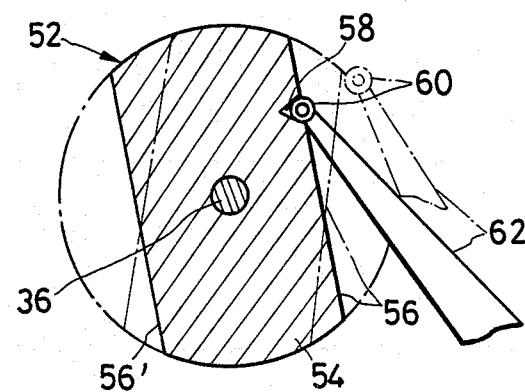
FIG. 6 is a horizontal section through the head position control mechanism, taken along the line VI—VI in FIG. 3.

Before the disk drive is electrically powered on, the solenoid 68 of the head locking mechanism 50 is of course the unenergized, with the locking lever 62 in locking engagement with the rotary disk 52 under the influence of the tension spring 66, as indicated by the dashed lines in FIG. 1 and by the solid lines in FIG. 6. The roller 60 on the locker lever 62 is now engaged in the notch 58 in the rotary disk 52, with the result that the transducer head 28 is locked in contact with the noneffective surface region 24 of the magnetic disk 10. There is accordingly no possibility of the transducer head 28 being displaced onto the effective surface region 18 of the magnetic disk 18 by vibrations or shocks that may be applied to the apparatus when the latter is held switched off.

The disk drive motor 16 is set into the rotation as the disk drive is powered on. We recommend that the solenoid 68 of the head locking mechanism 50 be energized just when, or very shortly after, the disk drive is powered on. The solenoid 68 when energized will cause the locking lever 62 to pivot out of locking engagement will the rotary disk 52 against the force of the tension spring 66. The head arm 32 is now free to move the transducer hear 28 from the noneffective surface region 24 of the magnetic disk 10 to any desired track in its effective surface region 18, although the head remains on the noneffective surface region 24 as long as the voice coil motor 38 is left unenergized.

As the magnetic disk 10 picks up speed, the transducer head 28 will start flying over the disk. Before this moment the transducer head 28 has been sliding over the noneffective surface region 24 of the magnetic disk 10, the effective surface region 18 thereof having been free from impairment by such sliding of the head. The voice coil motor 38 may be energized after the transducer head 28 has started flying over the magnetic disk 10, in order to temporarily return the head to a position over the outermost track of the disk. Then the voice coil motor 38 may be energized as required for transporting the transducer head 28 to a desired track for the commencement of data transfer.

When the apparatus is switched off after the data transfer operations, the solenoid 68 will become deenergized to permit the locking lever 62 to pivot in a counterclockwise direction, as viewed in FIGS. 1 and 6, under the force of the tension spring 66. This tension spring has been held extended while the solenoid 68 is being energized as above. The energy that has been thus stored in the tension spring 66 is released upon deenergization of the solenoid 68, causing the locking lever 62 to quickly move into locking engagement with the rotary disk 52. With the roller 60 rolling over the surface 56 of the rotary disk 52, the locking lever 62 will first cause the head arm 32 to transport the transducer head 28 to a position over the noneffective surface region 24 of the magnetic disk 10, whereupon the roller 60 will become engaged in the notch 58 in the surface 56.

Usually, in hard disk drives of this type, the magnetic disk rotates at 3600 rpm during data transfer with the transducer head, having a velocity of 16 meters per second (m/sec) at its periphery and that of 10 m/sec at its inner edge portion. It takes approximately 15 sec from the moment the apparatus is switched off to the moment the magnetic disk comes to a standstill. The roller 60 will become engaged in the notch 58 in about one to two sec after the apparatus is switched off. Thus, since the transducer head remains lifted off the magnetic disk until the speed of the underlying portion of the disk drops below 5 m/sec, the transducer head 28 can be moved over to the noneffective surface region 24 of the disk while the head is still flying over the disk. Then the transducer head 28 will land on the noneffective surface region 24 when its speed falls below 5 m/sec, and will remain locked thereon until the next time the apparatus is powered on.

POSSIBLE MODIFICATIONS

The above disclosed embodiment of our invention is subject to a variety of modifications or alternations within the broad teaching hereof. For example:

1. The locking lever 62 could be moved into and out of direct locking engagement with the head arm 32 or link 46, instead of with the rotary disk 52.

2. The head locking mechanism 50 could be actuated either manually or by other other means other than the solenoid 68.

3. The transducer head 28 could be returned to the noneffective surface region 24 of the magnetic disk 10 not when, but before, the disk drive is turned off, by actuating the head locking mechanism 50 either automatically or manually.

4. The transducer head 28 could be locked on the outer noneffective surface region 26, rather than on the inner noneffective surface region 24, of the magnetic disk 10.

5. A linear actuator might be employed for head transportation.

6. Means similar to the head locking mechanism 50 might be employed for locking the disk drive motor 16 against rotation when the rotation of the magnetic disk is not desired.

We claim:

1. A head position control mechanism for an apparatus for data transfer with a dislike recording medium having arranged in a radial direction thereon both an effective surface region capable of storing data and a noneffective surface region where no data is to be stored, the head position control mechanism comprising:

(a) disk drive means for imparting rotation to the recording medium;
    (b) a transducer head for data transfer with the effective surface region of the recording medium;
    (c) head transport means including a pivotal head arm for supporting the transducer head and for transporting the same substantially radially of the recording medium, the head transport means permitting the transducer head to contact the recording medium at least when the latter is held out of rotation by the disk drive means;
    (d) a rotary member pivotable jointly with the head arm of the head transport means about a common axis, said rotary member having a contact surface, with a notch defined therein, disposed in a plane parallel to the common axis of the rotary member and the head arm;
    (e) a locking lever pivotable in a plane normal to the common axis of the head arm and the rotary member into and out of relatively movable contact with the contact surface of the rotary member and further into and out of locking engagement in the notch in the contact surface, wherein the locking lever has a roller rotatably mounted thereon for rolling over the contact surface of the rotary member into and out of locking engagement in the notch;
    (f) a linear actuator coupled to the locking lever and energized at least during a data transfer operation of the apparatus for holding the locking lever out of contact with the rotary member in order to allow the head arm to transport the transducer head over the recording medium; and
    (g) a spring coupled to the locking lever and acting upon deenergization of the linear actuator for moving the locking lever into relatively movable contact with the contact surface of the rotary member at such a point thereon that the rotary member is pivoted with the head arm with the consequent movement of the transducer head to the noneffective surface region of the recording medium under the force of the spring, the locking lever moving into locking engagement in the notch in the contact surface upon movement of the transducer head to the noneffective surface region of the recording medium;
    (h) whereby the transducer head is locked on the noneffective surface region of the recording medium as long as the linear actuator remains unenergized.

* * * * *

UNITED STATES PATENT AND TRADEMARK OFFICE
CERTIFICATE OF CORRECTION

PATENT NO. : 4,807,072
DATED : February 21, 1989
INVENTOR(S) : Ono et al.

It is certified that error appears in the above-identified patent and that said Letters Patent is hereby corrected as shown below:

Column 1, line 28, change "hand sliding therefore" to --head sliding thereover--.

Column 3, line 57 change "and" to --an--.

Column 4, line 15 change "fails" to --falls--.

Column 5, line 8 change "with" to --the--.

Column 5, line 15 before "FIG. 6" insert the word --in--.

Column 5, line 67 change "the unenergized" to --held unenergized--

Column 6, line 12 after the word "into" delete the word "the".

Column 6, line 17 change "will to --with--.

Column 6, line 20 change "hear 28" to --head 28--.

Column 7, line 7 change "alternations" to --alterations--.

Signed and Sealed this

Fourteenth Day of November, 1989

*Attest:*

JEFFREY M. SAMUELS

*Attesting Officer*    Acting Commissioner of Patents and Trademarks